United States Patent [19]
Shimizu

[11] Patent Number: 5,748,589
[45] Date of Patent: May 5, 1998

[54] DIAGNOSIS OF AN OPTICAL DISK APPARATUS USING A DIAGNOSTIC METHOD CONTAINED ON AN OPTICAL DISK MEDIUM

[75] Inventor: Kikuo Shimizu, Hiratsuka, Japan

[73] Assignee: Hitachi, Ltd., Tokyo, Japan

[21] Appl. No.: 665,900

[22] Filed: Jun. 19, 1996

[30] Foreign Application Priority Data

Jun. 20, 1995 [JP] Japan .................................. 7-152844

[51] Int. Cl.$^6$ .................................................. G11B 7/00
[52] U.S. Cl. .................................................. 369/54; 369/58
[58] Field of Search .................................... 369/54, 58, 48, 369/32, 53, 56, 275.3

[56] References Cited

U.S. PATENT DOCUMENTS

| | | | |
|---|---|---|---|
| 4,969,139 | 11/1990 | Awmatam et al. | 369/58 |
| 5,119,291 | 6/1992 | Flannagan et al. | 369/47 |
| 5,537,537 | 7/1996 | Fujikawa et al. | 395/163.06 |

OTHER PUBLICATIONS

"SCSI Working Draft, X3T9.2 375R, Revision 10K", p. 117 and pp. 130–131.
Technical Guide Optical Drives and Libraries TGODL, HP Co., pp. 2–73 –2–84.

*Primary Examiner*—Nabil Hindi
*Attorney, Agent, or Firm*—Fay, Sharpe, Beall, Fagan, Minnich & McKee

[57] ABSTRACT

An optical disk apparatus that does not need the intervention of a host apparatus, such as a host computer, performs a diagnostic method of checking the optical disk apparatus for diagnosis using a diagnostic optical disk medium. Upon the detection of the loading of a diagnostic optical disk medium into an optical disk apparatus, an optical head reads diagnostic information written beforehand on the diagnostic optical disk medium, and a diagnostic operation is carried out to diagnose a writing or reading operation of the optical disk apparatus under the control of a main control circuit without requiring the intervention of a host computer. The results of diagnosis are written on the diagnostic optical disk medium or provided in some other fashion. If the results are stored on the disk, the host computer makes reference to the stored results when necessary.

22 Claims, 11 Drawing Sheets

| BYTE NO. (HEX) | DEFINITION | SET VALUES |
|---|---|---|
| 0 : 1 | DDS IDENTIFIER | SPECIFIC TO THE DIAGNOSTIC OPTICAL DISK MEDIUM |
| 2 | DIAGNOSTIC OPTICAL DISK MEDIUM FLAG | OPTIONAL |
| 3 : FF | PDL MANAGEMENT INFORMATION SDL MANAGEMENT INFORMATION RESERVED (00HEX) | SPECIFIC TO THE DIAGNOSTIC OPTICAL DISK MEDIUM |
| 100 : 109 | DIAGNOSTIC ZONE SPECIFICATION (DIAGNOSIS STARTING BLOCK NUMBER) (DIAGNOSIS ENDING BLOCK NUMBER) | OPTIONAL |
| 10A : 10B | NUMBER OF CYCLES OF DIAGNOSTIC LOOP | OPTIONAL |
| 10C : 10D | RECORDING DATA PATTERN FOR DIAGNOSIS | OPTIONAL |
| 10E : 10F | WRITING POWER FOR DIAGNOSIS | OPTIONAL |
| 110 : 1FF OR 3FF | RESERVED (00HEX) | RESERVED (00HEX) |

(Rows grouped as: 201, 202, 203, 204, 205)

| BYTE NO. (HEX) | DEFINITION | SET VALUES |
|---|---|---|
| 0 | DDS IDENTIFIER | SPECIFIC TO THE DIAGNOSTIC OPTICAL DISK MEDIUM |
| 1 | | |
| 2 | DIAGNOSTIC OPTICAL DISK MEDIUM FLAG | OPTIONAL |
| 3 : FF | PDL MANAGEMENT INFORMATION SDL MANAGEMENT INFORMATION RESERVED (00HEX) | SPECIFIC TO THE DIAGNOSTIC OPTICAL DISK MEDIUM |
| 100 : 109 | DIAGNOSTIC ZONE SPECIFICATION (DIAGNOSIS STARTING BLOCK NUMBER) (DIAGNOSIS ENDING BLOCK NUMBER) | OPTIONAL |
| 10A : 10B | NUMBER OF CYCLES OF DIAGNOSTIC LOOP | OPTIONAL |
| 10C : 10D | RECORDING DATA PATTERN FOR DIAGNOSIS | OPTIONAL |
| 10E : 10F | WRITING POWER FOR DIAGNOSIS | OPTIONAL |
| 110 : 1FF OR 3FF | RESERVED (00HEX) | RESERVED (00HEX) |

*FIG. 2*

| BYTE NO. (HEX) | DEFINITION | SET VALUES |
|---|---|---|
| 0<br>1 | DDS IDENTIFIER | SPECIFIC TO THE DIAGNOSTIC OPTICAL DISK MEDIUM |
| 2 | DIAGNOSTIC OPTICAL DISK MEDIUM FLAG | ( FE ) HEX |
| 3<br>:<br>FF | PDL MANAGEMENT INFORMATION<br>SDL MANAGEMENT INFORMATION<br>RESERVED (OOHEX) | SPECIFIC TO THE DIAGNOSTIC OPTICAL DISK MEDIUM |
| 100<br>:<br>109 | DIAGNOSTIC ZONE SPECIFICATION<br>(DIAGNOSIS STARTING BLOCK NUMBER)<br>(DIAGNOSIS ENDING BLOCK NUMBER) | (0000000000) HEX<br>(000000FFFF) HEX |
| 10A<br>:<br>10B | NUMBER OF CYCLES DIAGNOSTIC LOOP | (0 0 0 1) HEX |
| 10C<br>:<br>10D | RECORDING DATA PATTERN FOR DIAGNOSIS | (A A 5 5) HEX |
| 10E<br>:<br>10F | WRITING POWER FOR DIAGNOSIS | OPTIONAL |
| 110<br>:<br>1FF OR 3FF | RESERVED (OOHEX) | RESERVED (OOHEX) |

FIG. 5

| | |
|---|---|
| PRODUCT NAME (ASCII CODE) | (16 BYTES) |
| MANUFACTURE CODE (ASCII CODE) | (8 BYTES) |
| MANUFACTURE REVISION (ASCII CODE) | (8 BYTES) |
| RESULTS OF DIAGNOSIS,<br>1. NUMBER OF BLOCKS SUBJECTED TO ERASING PROCESS,<br>2. NUMBER OF BLOCKS SUBJECTED TO WRITING PROCESS,<br>3. NUMBER OF BLOCKS SUBJECTED TO READING PROCESS,<br>4. NUMBER OF BLOCKS RECOVERED DURING ERASING<br>5. NUMBER OF BLOCKS RECOVERED DURING WRITING<br>6. NUMBER OF BLOCKS RECOVERED DURING READING | (16 BYTES)<br>(16 BYTES)<br>(16 BYTES)<br>(8 BYTES)<br>(8 BYTES)<br>(8 BYTES) |
| SPECIFIED DATA [FF]HEX (408 OR 920 BYTES) | |

{104 BYTES}

*FIG. 7*

DIAGNOSIS OF AN OPTICAL DISK APPARATUS USING A DIAGNOSTIC METHOD CONTAINED ON AN OPTICAL DISK MEDIUM

BACKGROUND OF THE INVENTION

1. Field of the Invention

The present invention relates generally to the diagnosis of an information write/read apparatus and, more particularly, to diagnosis of an optical disk apparatus using an optical disk containing diagnostic identification information and, optionally, diagnostic process information, for performing a diagnosis of the optical disk apparatus.

2. Description of the Related Art

Conventionally, two methods have been employed to analyze the operability of an optical disk apparatus. According to the first conventional method, a host apparatus, such as a host computer, provides diagnostic commands and receives results of the diagnosis carried out according to the diagnostic commands. According to the second method, the host apparatus provides ordinary write diagnostic commands for writing information onto an optical disk loaded in the optical disk apparatus, and analyzes the write and read systems of the optical disk apparatus on the basis of a reading of the written diagnostic commands.

An example of the first method is described in "SCSI WORKING DRAFT, X3T9.2 375R, Revision 10K", and *Technical Guide Optical Drives and Libraries* TGODL, HP Co. Here, a small computer system interface (SCSI) issues a command, "SEND DIAGNOSTIC", containing diagnostic information and diagnostic parameters from a host SCSI. Upon receiving this command, an optical disk apparatus carries out self-diagnosis according to the diagnostic parameters. Then, the host SCSI issues a command, "RECEIVE DIAGNOSTIC RESULTS", transfers the results of the diagnosis to a host apparatus, and obtains information on the results of the diagnosis.

Thus, the prior art has suffered from the requirement to use a host apparatus and/or an operator to perform diagnosis of an optical disk apparatus. Further, to accurately confirm the quality of the optical disk apparatus, the diagnostic environment must be the same as the environment employed by the manufacturer of the optical disk apparatus, and a recording medium suitable for use as a quality standard is required.

SUMMARY OF THE INVENTION

The present invention solves these and other problems of the prior art by permitting diagnosis of the optical disk apparatus without requiring control of a host apparatus. Further, according to the present invention, a user can carry out the same diagnosis as was previously performed by the apparatus manufacturer to enhance the quality and reliability of the diagnosis results.

To achieve these and other objectives, the present invention provides an optical disk apparatus that employs a replaceable optical disk medium, which contains information permitting the optical disk apparatus to determine whether the loaded replaceable optical disk is a diagnostic optical disk medium upon the loading of the disk, and information input by the apparatus to begin diagnosis automatically upon identification of the disk as a diagnostic optical disk medium.

In a preferred embodiment, the optical disk contains diagnostic process information to be read by the optical disk apparatus, which carries out diagnosis according to the diagnostic process information.

The diagnostic optical disk to be employed in carrying out the diagnostic method has a diagnostic identification information writing zone in a medium definition information writing zone, to store information used for identifying the optical disk as a diagnostic optical disk, and, optionally, a diagnostic process information writing zone in a medium definition information writing zone or user's zone, for storing information concerning the contents of the diagnosis.

The optical disk apparatus may be provided with a logic that starts diagnosis automatically when the diagnostic optical disk medium is loaded into the optical disk apparatus. The logic automatically reads diagnostic information, including the contents of diagnosis and diagnostic parameters previously written onto the diagnostic optical disk, and carries out the diagnosis according to the diagnostic information read from the disk.

According to another aspect of the invention, the optical disk apparatus and diagnostic method may be designed to write the diagnosis results onto the diagnostic optical disk, preferably in a user's zone of the disk, to permit the user to refer to the results when necessary.

When the optical disk apparatus is capable of reading optical disks formatted according to a plurality of kinds of protocols, the optical disk apparatus and the diagnostic method may be made capable of carrying out diagnosis using a plurality of kinds of diagnostic optical disk media. In this case, the diagnostic optical disk of the present invention may be formatted according to a plurality of kinds of protocols.

Further, the results of diagnosis may be written in text files that can be recognized by a plurality of different operating systems. Data representing the results of the diagnosis may be written in specified characters, such as ASCII characters.

According to another aspect of the invention, the optical disk apparatus and the diagnostic method may turn on an external indicating element, such as a light-emitting diode, to request cleaning when the diagnosis results exceed thresholds set for identifying faults in the optical disk apparatus. Preferably, the thresholds are stored within the optical disk apparatus.

The diagnostic information to be written on the diagnostic optical disk may be divided into diagnostic identification information and diagnostic process information. Although the diagnostic process information need not necessarily be on the diagnostic optical disk, desirably, the diagnostic process information is written on the diagnostic optical disk for the effective utilization of the present invention.

The diagnostic identification information is used for deciding whether the optical disk is a diagnostic optical disk, and may be constituted by a diagnostic optical disk medium flag. The diagnostic identification information is written in a medium definition information writing zone.

The medium definition information writing zone is a specific zone to which the optical disk apparatus always gains access when the optical disk is loaded into the optical disk apparatus. User access to this zone is inhibited. For example, a disk definition structure (DDS), which is always read to detect the medium information when the optical disk is loaded, may be used. The information identifying the diagnostic optical disk and diagnostic parameters is written beforehand. When the diagnostic identification information is written in the medium definition information writing zone, diagnosis can be carried out without changing the conventional optical disk medium standards.

The diagnostic process information includes numerical values specifying conditions for diagnosis and process flags, and is written in the user's zone or the medium definition information writing zone when the same is written on the diagnostic optical disk. If the diagnostic process information is written in the medium definition information writing zone, the user cannot modify the diagnostic process information, and thus the diagnostic information is secure from mistakes made by the user. If the diagnostic process information is written in the user's zone, however, the diagnostic conditions can be changed by the user.

The optical disk medium may be a rewritable-type disk on which information can be read and written, a write-once optical disk, or a read-only optical disk, such as a CD.

The read-only type, however, cannot be employed to store the results of diagnosis, and a diagnostic signal level standardized according to the characteristics of the optical disk apparatus must be written beforehand.

According to the teachings of the present invention, diagnosis begins automatically upon loading and identification of the diagnostic optical disk medium. Therefore, control commands conventionally provided by a host apparatus are unnecessary, and diagnosis is autonomous.

Further, the diagnostic conditions and parameters need not be specified each time the diagnosis is performed, and, if the diagnostic optical disk is provided by the manufacturer of the apparatus, the diagnostic environment is assured to be the same as that present at the time of manufacture. On the other hand, when the diagnostic process information is rewritable, the diagnostic environment can be tailored to the requirements of the user.

Moreover, when the results of diagnosis can be written on the diagnostic optical disk, the results can be read for confirmation when desired, and reference to the quality of the optical disk apparatus can be made immediately upon completion of the diagnosis. Preventive maintenance can thus be performed at a convenient or necessary time.

Additionally, the diagnostic optical disk can be formatted according to various operating systems, which provides the user with great facility for performing diagnosis according to the invention.

BRIEF DESCRIPTION OF THE DRAWINGS

FIG. 2 explains the byte definition of the DDS of a diagnostic optical disk medium according to a preferred embodiment of the present invention;

FIG. 5 is a table showing the definition of the DDS bytes of a diagnostic optical disk medium according to a preferred embodiment of the present invention;

FIG. 7 conceptually shows information representing the results of a diagnosis;

DETAILED DESCRIPTION OF THE PREFERRED EMBODIMENTS

Figure 1:
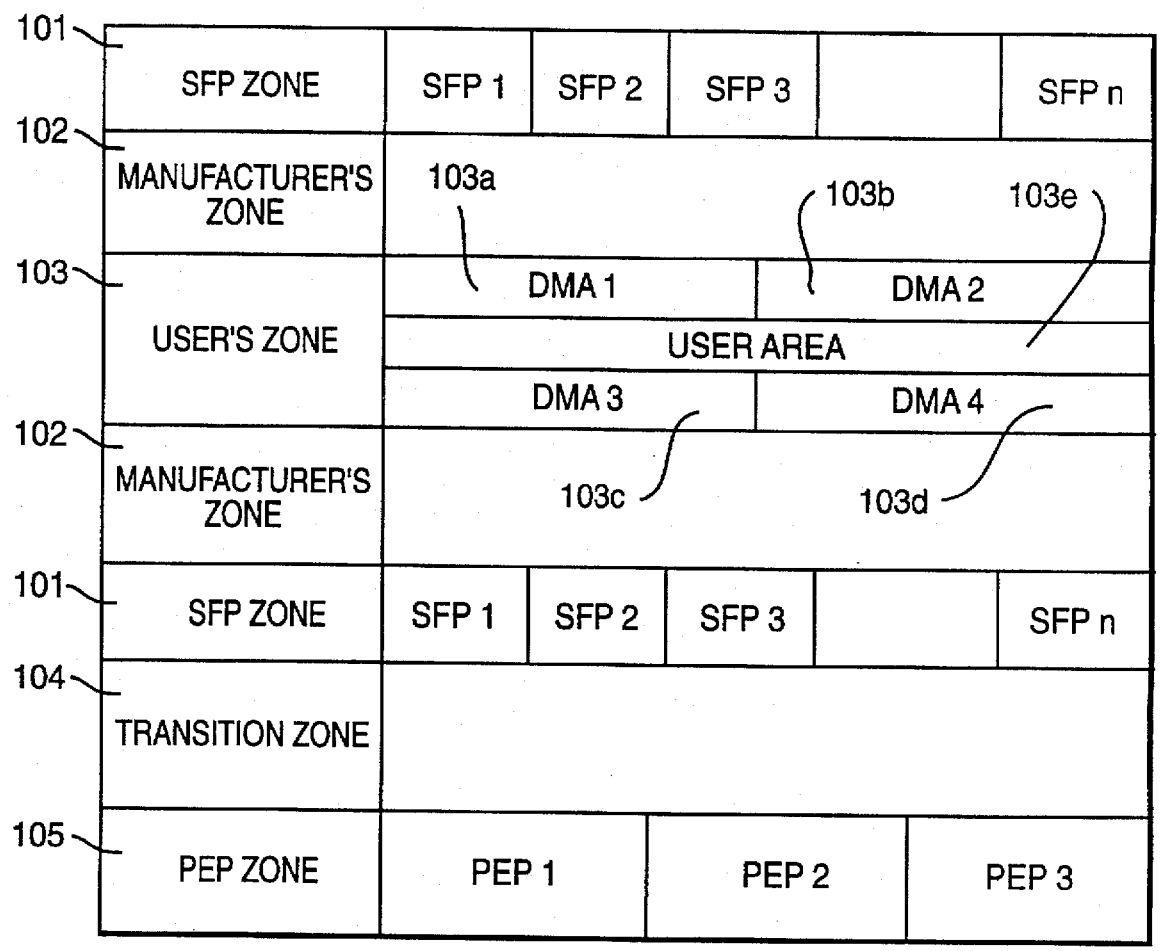
FIG. 1 shows conceptually the format of a diagnostic optical disk medium according to a preferred embodiment of the present invention.

FIG. 1 is a conceptual diagram of a diagnostic optical disk medium structured according to a preferred embodiment of the present invention. FIGS. 2 and 3(a)-3(d) assist in explaining various pieces of control information stored in the diagnostic optical disk medium of FIG. 1, and FIG. 4 is a block diagram of an optical disk apparatus that reads diagnostic information from the diagnostic optical disk medium of FIG. 1 to perform diagnosis according to a preferred embodiment of the present invention.

Figure 4:
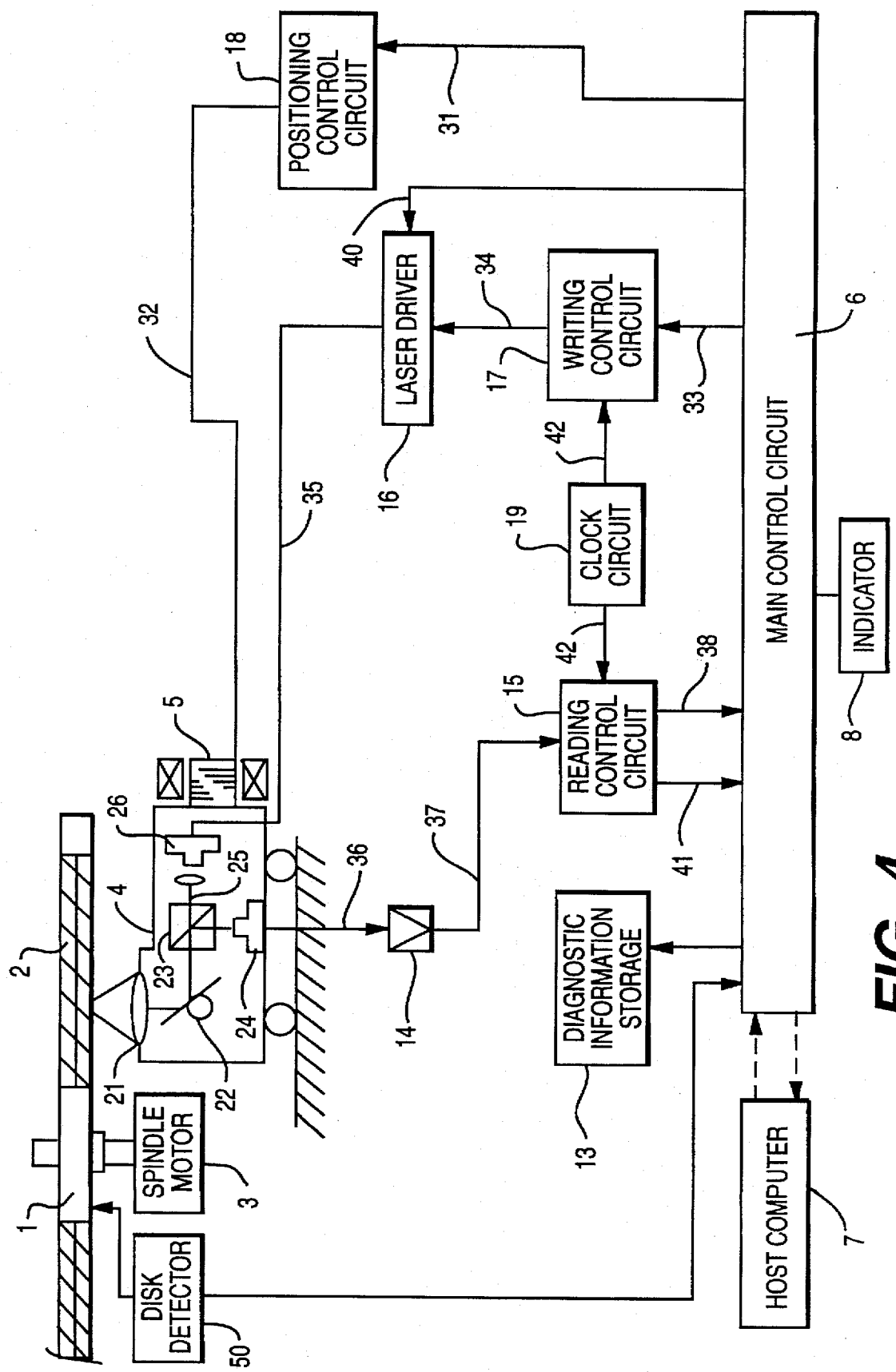
FIG. 4 is a block diagram of an optical disk apparatus according to a preferred embodiment of the present invention.

Beginning with FIG. 4, the optical disk apparatus according to the illustrated embodiment includes a diagnostic optical disk 1 having a recording film 2, a spindle motor 3 for driving the diagnostic optical disk 1 for rotation, an optical head 4 for writing information on and reading information from the diagnostic optical disk 1 (assuming a writable optical disk), a voice coil motor 5 for positioning the optical head at a desired position, and control systems including a main control circuit 6. Of course, if the optical disk 1 is a read-only type optical disk, the optical head 4 does not write information to the optical disk. The control systems include a positioning control system controlled by a main control system, an information writing system, an information reading system, and a reflection detecting system for detecting the intensity of reflected light.

The positioning control system positions the optical head 4, and includes the voice coil motor 5, and a positioning control circuit 18 for controlling the position of the voice coil motor 5 by supplying a drive current 32 in accordance with travel information 31 provided by the main control circuit 6.

The information writing system includes a write control circuit 17 that converts recording data 33 into recording coded data 34 of, for example, a run length limiting code string such as 2-7 modulation code, in synchronism with a clock 42 generated by a clock generating circuit 19, and a laser driver 16 that transfers the recording coded data 34 as a recording pulse signal 35 to a semiconductor laser 26.

The information reading system includes a DC amplifier 14 that amplifies a read output 36 provided by a photodetector 24 included in the optical head 4 to provide a read code 37, and a reading control circuit 15 having a demodulating circuit which executes a decoding operation to reverse the write coding operation and demodulate the read code 37. The reading control circuit 15 gives address information 41 and reproduced data 38 to the main control circuit 6.

In the optical head 4, a laser beam 25 emitted by the semiconductor laser 26 travels through an optical system and falls on a galvanomirror 22, and the reflected laser beam is focused by an objective 21 onto the recording film 2. This is a general description of a conventional optical head, but the optical head 4 is not so limited. Further, the components shown in FIG. 4 that are not directly connected with the improvements of the present invention have been simplified or omitted for added clarity of the invention. Additionally, a phase-change optical disk apparatus may be employed instead of the rewritable or write-once type described.

The laser beam reflected by the recording film 2 is detected by the reflection detecting system, which includes a beam splitter 23 for splitting the incident light; lenses (not shown); and a photodetector 24. Although only one photodetector is shown in the drawing, the optical disk apparatus may include a plurality of photodetectors for automatic focusing control or tracking control, and for generating a data reading signal. The read output 36 is proportional to the intensity of light received by the photodetector 24, and equivalent to the information reading signal. If desired, an additional photodetector for receiving the reflected light may be employed, and the read output 36 may be extracted from an automatic focusing control signal or a tracking signal.

The loading state of the optical disk is detected by a disk detector 50. Loading may be indicated upon completing the transport and fastening of the optical disk to a disk mount rotatably driven by the spindle motor 3, or by detecting light reflected by the optical disk using the reflection detecting system described above.

A system of writing recognition codes on a diagnostic optical disk medium for use in analyzing an optical disk apparatus according to the invention will be described with respect to FIG. 1.

The format of the diagnostic optical disk according to this embodiment includes an SFP zone 101, a manufacturer's zone 102, a user's zone 103, a transition zone 104, and a PEP zone 105. The user's zone 103 has four defect management areas (DMAS) 103a, 103b, 103c, and 103d, and a user's area 103e. The DMA1 103a, DMA2 103b, DMA3 103c, and DMA 4 103d are written on fixed tracks and fixed sectors to quadruple the writing data.

Principally, the disk definition structure DDS of the diagnostic optical disk medium, a primary defect list (PDL), and secondary defect list (SDL) are written in the DMA1 103a to DMA4 103d. The DDS is in the foremost block of the DMA, and PDL management information and SDL management information are written.

According to the preferred embodiment of the present invention, a flag for identifying the diagnostic optical disk medium is written in an undefined byte of the DDS to enable the optical disk apparatus to identify the diagnostic optical disk medium.

FIG. 2 is a diagram showing the definition of the bytes of the DDS by way of example. The diagnostic optical disk medium uses undefined bytes No. 2 (2 Hex) and No. 256 (100 Hex) to 271 (10F Hex). Byte No. 2 contains a diagnostic optical disk medium flag 201 identifying the diagnostic optical disk medium, and the 16 bytes Nos. 256–271 (100 Hex-10F Hex) indicate execute parameters for diagnosis, which will be described later.

There are a plurality of possible formats for the optical disk. The optical disk is identified by information stored in the PEP zone 105, defined information indicated by byte No. 0, and defined information indicated by byte No. 1 or byte No. 3. Therefore, the diagnostic optical disk medium can be produced by using the undefined bytes without changing the format definition of the optical disk medium.

Byte Nos. 256–265 (100 Hex-109 Hex) specify the diagnostic zone of the diagnostic optical disk at 202. The leading five bytes indicate the diagnosis starting block number (i.e., the number of a block from which diagnosis is started), and the following five bytes indicate a diagnosis ending block number (i.e., the number of a block at which diagnosis ends), for checking a selected zone on the optical disk for diagnosis.

A specified diagnostic loop No. 203 is indicated by byte Nos. 266 and 267 (10A Hex and 10B Hex) to specify the number of times diagnosis is to be repeated (from 0 to 65535 cycles).

A specified recording data pattern 204 for diagnosing the writing system is indicated by byte Nos. 268 and 269 (10C Hex and 10D Hex). Although a one- or two-byte recording data pattern can be specified in this example, an optional recording data pattern can be specified by expanding the zone.

The writing light power 205 used for checking the writing system is specified by the byte Nos. 270 and 271 (10E Hex and 10F Hex). In this embodiment, two bytes are set in the zone, the ratio of a specified value to the present light power of 0100 Hex as a reference value is calculated, and the writing light power is controlled using the ratio as a writing coefficient 40. The writing light power can be varied in a range from 0 to 200% of the present light power. Resolution can be enhanced by increasing the number of bytes.

Figure 3A:
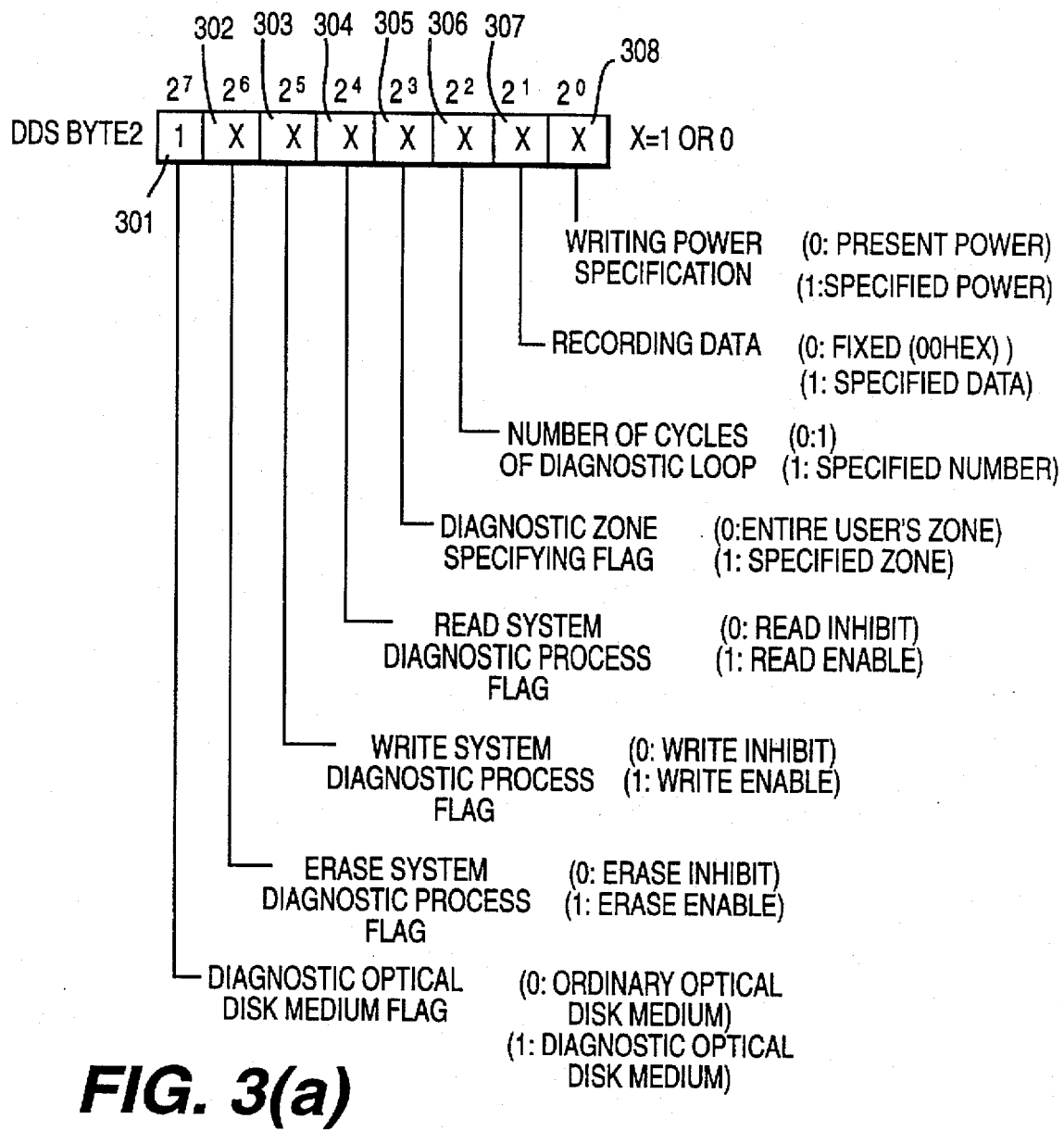
FIGS. 3(a)-3(d) illustrate the bit definition of a diagnostic optical disk medium flag set on a diagnostic optical disk according to a preferred embodiment of the present invention.

The diagnostic optical disk medium flag 201 identifying the diagnostic optical disk medium will be described in further detail. FIG. 3(a) is a conceptual diagram showing the definition of the diagnostic optical disk medium flag 201 by way of example. The seventh bit indicates a diagnostic optical disk medium flag 301 identifying the diagnostic optical disk medium. The flag 301 is set to 1 to indicate a diagnostic optical disk medium, or to 0 to indicate an ordinary optical disk medium. In such case, the other bits, and the diagnostic parameters, are ignored.

The sixth bit indicates an erase system checking process flag 302, the fifth bit indicates a writing system checking process flag 303, and the fourth bit indicates a reading system checking process flag 304. The checking processes are executed when the corresponding flags are set to 1, and are inhibited when the corresponding flags are set to 0.

The lower four bits are flags indicating the condition of the diagnostic parameters specified by the bytes defining the DDS. The third bit is a diagnostic zone specifying flag 305 indicating whether the diagnostic zone assignment is effective, the second bit is a diagnostic loop number specifying flag 306 indicating whether the assignment of the number of cycles of the diagnostic loop is effective, the first bit is a recording data pattern specifying flag 307 indicating whether the assignment of a data pattern for writing is effective, and the 0th bit is a writing power specifying flag 308 indicating whether the assignment of writing power is effective. The diagnostic parameters are effective when the corresponding flags are set to 1, and the optical disk apparatus carries out diagnosis with reference to the diagnostic parameters. When the flags are set to 0, default values are applied.

Figure 3B:
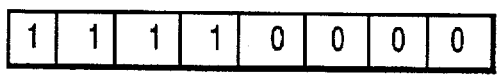

When the diagnostic optical disk medium flag is set as shown in FIG. 3(b), the entire user's zone is analyzed, the erase system checking process, the writing system checking process, and the reading system checking process are executed, the diagnostic loop is executed once, the present power is used for the writing system checking process, and 00 Hex is written repeatedly as recording data. The data may be of any type, provided that the data can be stored in the optical disk apparatus.

Figure 3C:
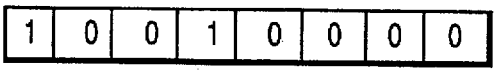
Figure 3D:

When a diagnostic optical disk medium having the diagnostic optical disk medium flag shown in FIG. 3(c) is loaded into the optical disk apparatus, the optical disk apparatus executes only one cycle of the reading checking process for the entire user's zone. An exemplary diagnostic sequence using the diagnostic optical disk medium 1 thus constructed will be described below.

A loading operation is carried out when the diagnostic optical disk 1 is loaded into the optical disk apparatus, and the disk detector 50 detects the loading of the disk. Then, the optical head 4 is positioned at the block in which the DDS is written to read the contents of the DDS. The same operation as that performed for reading user's data is carried out to read the DDS. The read output 36 of the photodetector 24 that receives the reflected laser beam is amplified by the DC amplifier 14 to provide the read code 37. The read code 37 is decoded in synchronism with the clock 42 by the demodulating circuit, which performs the decoding operation to reverse the coding operation employed during the write process. The output of the demodulating circuit is then provided to the main control circuit 6.

The main control circuit 6 examines the seventh bit of the DDS byte No. 2 and, if the seventh bit is in the 1 state, stores the diagnostic optical disk medium flag and the diagnostic parameters in a diagnostic information storage. Then, the optical disk apparatus executes diagnostic processes to analyze the writing system and the reading system according to the diagnostic information, regardless of whether the optical disk apparatus is connected to a host computer.

Figure 6:
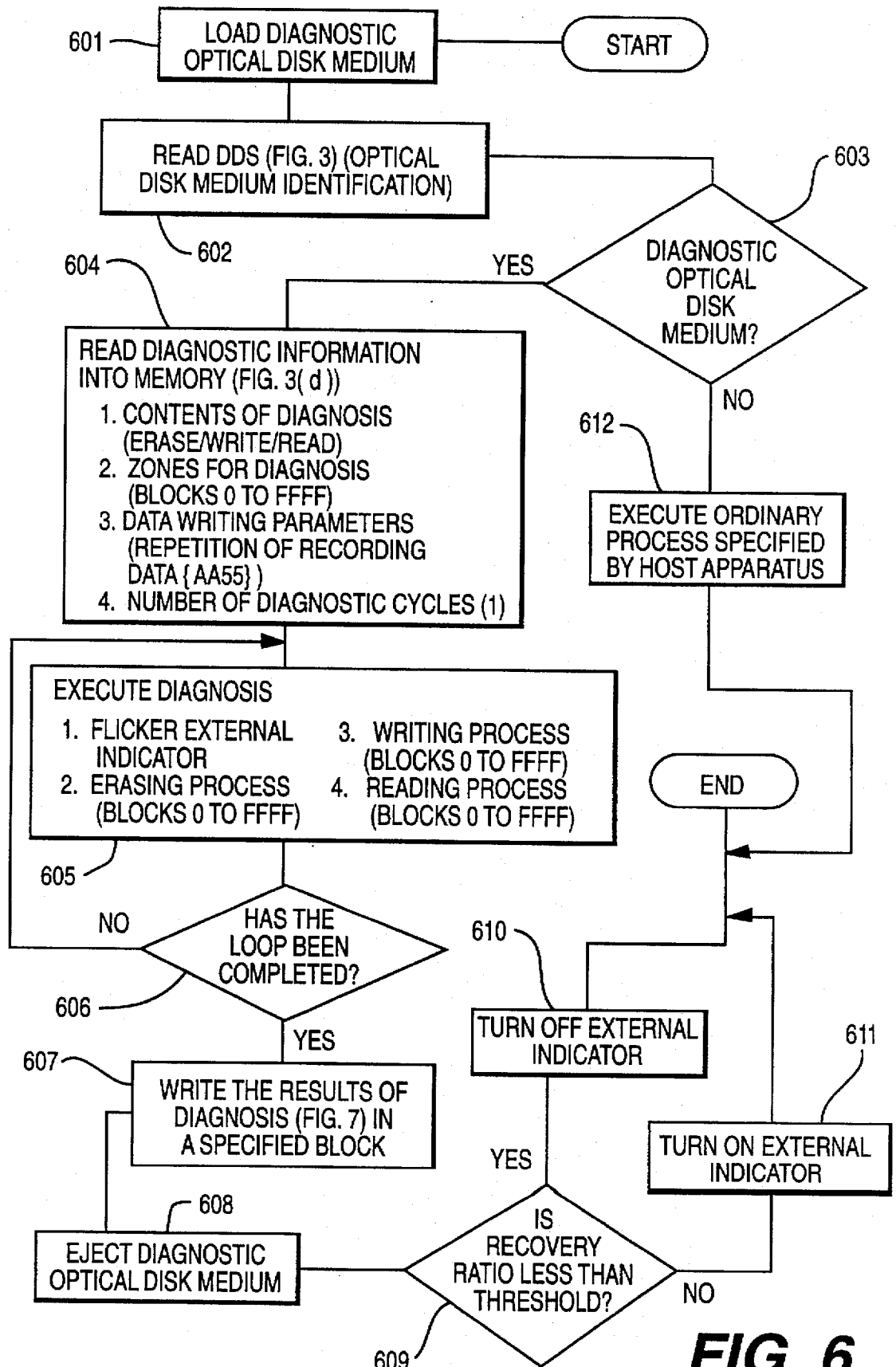
FIG. 6 is a flowchart of a diagnostic method for analyzing an optical disk apparatus according to a preferred embodiment of the present invention.

A concrete example of the diagnostic process to be executed based on the defined DDS information will be described next with reference to a flowchart of the diagnostic process. FIG. 5 illustrates a table showing the definition of the DDS bytes of the diagnostic optical disk by way of example, and FIG. 6 is a flowchart of the diagnostic process.

After the diagnostic optical disk is loaded into the optical disk apparatus in step 601, the DDS information is read in step 602, and the diagnostic optical disk is identified in step 603. When byte No. 2 of the DDS is FE Hex and the bit indicating the diagnostic optical disk medium flag is set in the state shown in FIG. 3(d), the apparatus decides that the optical disk is a diagnostic optical disk. If an optical disk other than a diagnostic optical disk is loaded into the optical disk apparatus, the diagnostic process is skipped and an ordinary process specified by the host apparatus is executed in step 612.

When the optical disk loaded into the optical disk apparatus is identified as a diagnostic optical disk, the diagnostic process information is read into the memory in step 604. The diagnostic process information includes the contents of the diagnostic processes, zones to be checked for diagnosis, data writing parameters, and the number of diagnostic cycles.

Then, diagnosis is executed on the basis of the diagnostic process information in step 605. In this example, the erasing process, the writing process, and the reading process are executed for all of the blocks 0 to FFFF. The data pattern employed for the writing process is the repetition of AA55 Hex. The optical disk apparatus flickers an indicator 8 during the diagnostic process to indicate that the diagnosis continues. When a plurality of diagnostic cycles are specified, the diagnostic process is repeated by the specified diagnostic cycles in step 606. Since the specified number of diagnostic cycles is one in this example, the foregoing process is executed only once.

Although the specified writing power in this example is equal to the present power, the output power of the semiconductor laser 26 is controlled by changing the current of the writing pulse 35 according to the value of the diagnostic process information. More specifically, the output of the laser driver 16 is controlled by changing the writing coefficient information 40 for controlling the power of the writing laser beam when the 0th bit of the flag for identifying the diagnostic optical disk medium is set to the 1 state.

After the diagnostic process has been completed, information representing the results of the diagnosis is written in a specified block of the diagnostic optical disk 1 in step 607.

FIG. 7 is a conceptual view showing information representing the results of diagnosis by way of example. In FIG. 7, 104 bytes of information is written for one diagnostic cycle. Product name, manufacture code, and manufacture revision are written in ASCII codes, and the number of erased blocks, the number of written blocks, the number of read blocks, and the frequencies of internal recovery in the erase process, the writing process, and the reading process are written.

Since product name, manufacture code, and manufacture revision are written, defective optical disk apparatuses can be easily identified by making reference to the information representing the results of diagnosis after continuously inspecting the quality of a plurality of optical disk apparatuses in the manufacturing process.

The diagnostic optical disk medium may be formatted by MS-DOS or any other suitable operating system (OS), such as UNIX, JIS, CP/M, or Macintosh. Further, the results of diagnosis may be stored in a diagnostic information storage 13 instead of storing the same in the diagnostic optical disk 1.

After diagnosis has been accomplished, the indicator 8 is turned off and the diagnostic optical disk 1 is ejected from the optical disk apparatus in step 608. The diagnostic optical disk 1 is reloaded into the optical disk apparatus, which is now set in a diagnosis-ineffective mode, and the quality of the diagnosed optical disk apparatus can be examined by reading data from the block storing the results of diagnosis.

The diagnostic process recovery ratio (the ratio of the number of blocks processed by recovery process to the number of processed blocks) is compared with a quality threshold stored in the main control circuit 6 of the optical disk apparatus in step 609 and, if the diagnostic process recovery ratio is greater than the quality threshold, the indicator 8, which may be an LED, is turned on in step 611. Usually, the indicator 8 is turned off when the optical disk apparatus does not contain an optical disk (step 610). Therefore, it is possible to indicate that, for example, the optical head 4 needs cleaning by turning on the indicator 8.

Figure 8:
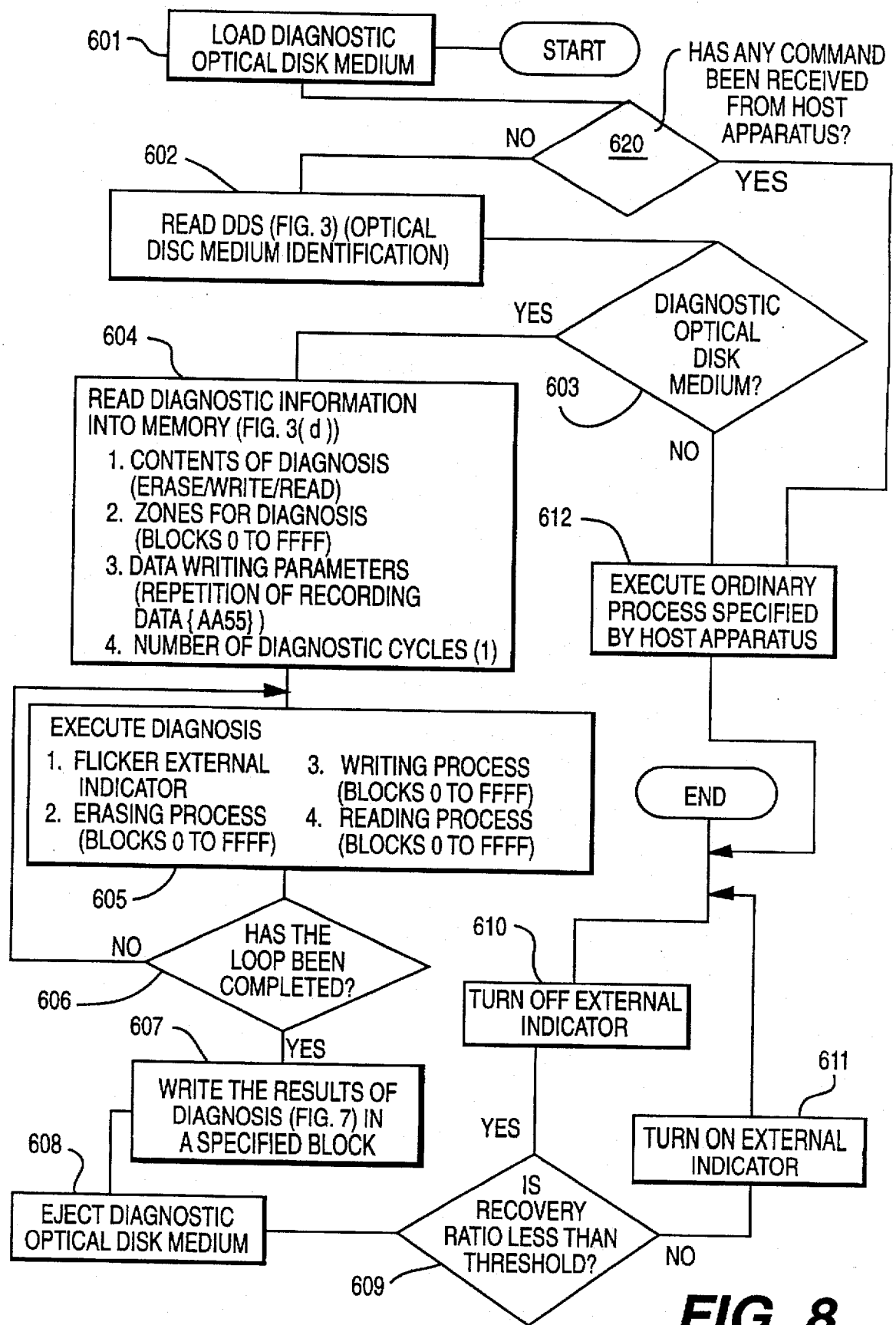
FIG. 8 is a flowchart of a diagnostic method for analyzing an optical disk apparatus, according to a preferred embodiment of the present invention.

When the results of diagnosis are stored on the diagnostic optical disk 1, the host apparatus cannot intervene to read the results of diagnosis executed previously when diagnosis is started upon the loading of the diagnostic optical disk 1 into the optical disk apparatus. An opportunity for the intervention of the host apparatus can be provided before diagnosis is started by a procedure shown in FIG. 8, to provide an opportunity to read the results of diagnosis written previously on the diagnostic optical disk after the diagnostic optical disk has been loaded into the optical disk apparatus. As shown in FIG. 8, a query is made in step 620 (preceding step 602) to identify the diagnostic optical disk medium to see whether any command is received from the host apparatus. If a command is received from the host apparatus during a predetermined wait time, diagnosis is aborted and an ordinary process specified by the host apparatus, such as a process for reading the results of past diagnosis from the diagnostic optical disk, is executed in step 612.

An opportunity to read the results of a past diagnosis can be provided by providing the diagnostic optical disk with a diagnosis execute flag for indicating either a diagnosis-effective state or a diagnosis-ineffective state, in addition to the diagnostic optical disk medium flag. An appropriate bit of the diagnostic optical disk medium flag is assigned to a diagnostic execute flag, the diagnosis execute flag is set to the 1 state upon the accomplishment of diagnosis, and the diagnosis execute flag is set to the 0 state to make diagnosis effective after the results of the past diagnosis have been read.

For example, the 0th bit of the diagnostic optical disk medium flag 201 serving as a writing power specifying flag 308 is assigned to a diagnosis execute flag 808, and the following control logic can be used.

Figure 9:
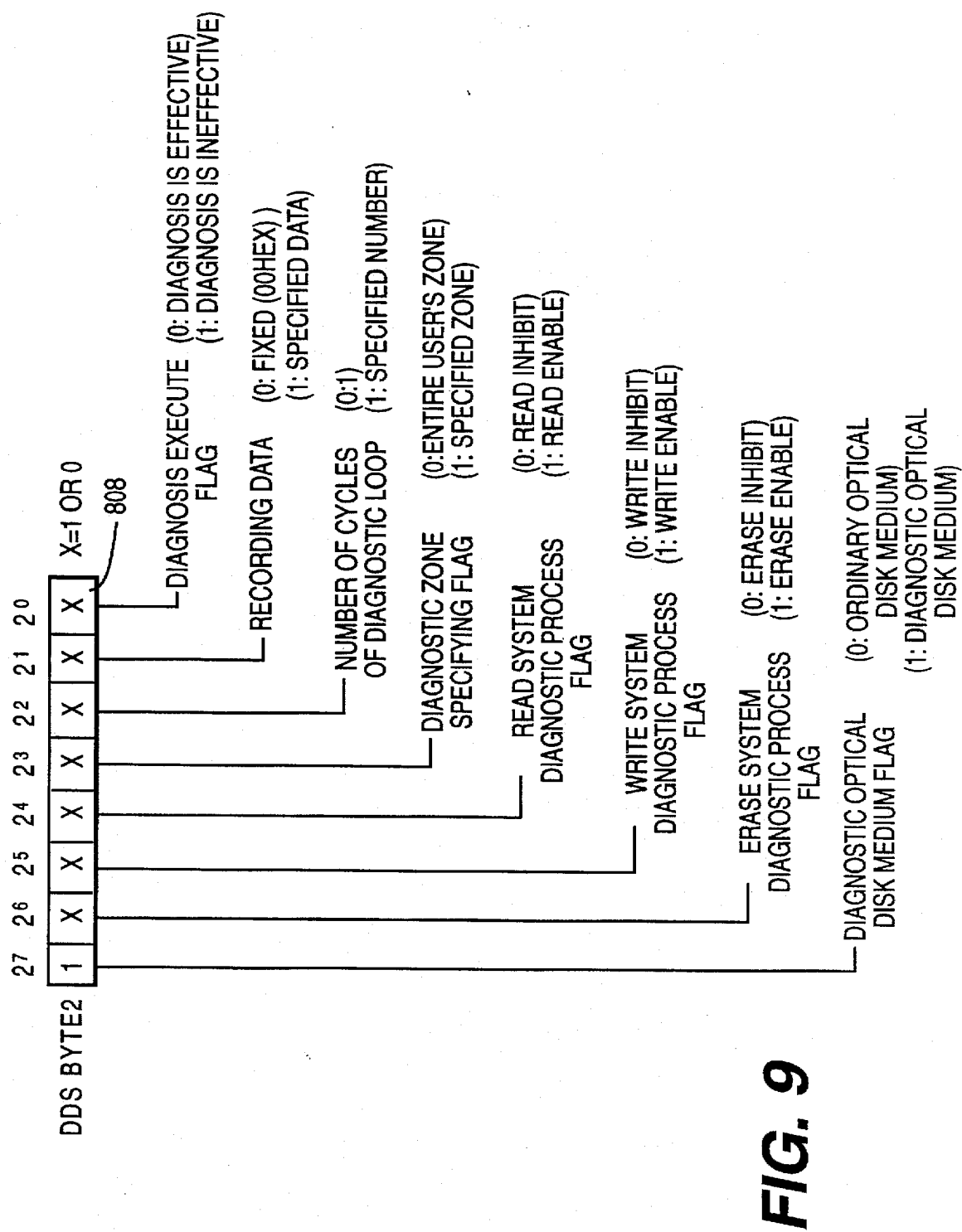
FIG. 9 illustrates an optical disk medium flag having a bit assigned to a diagnosis execute flag by way of example.
Figure 10:
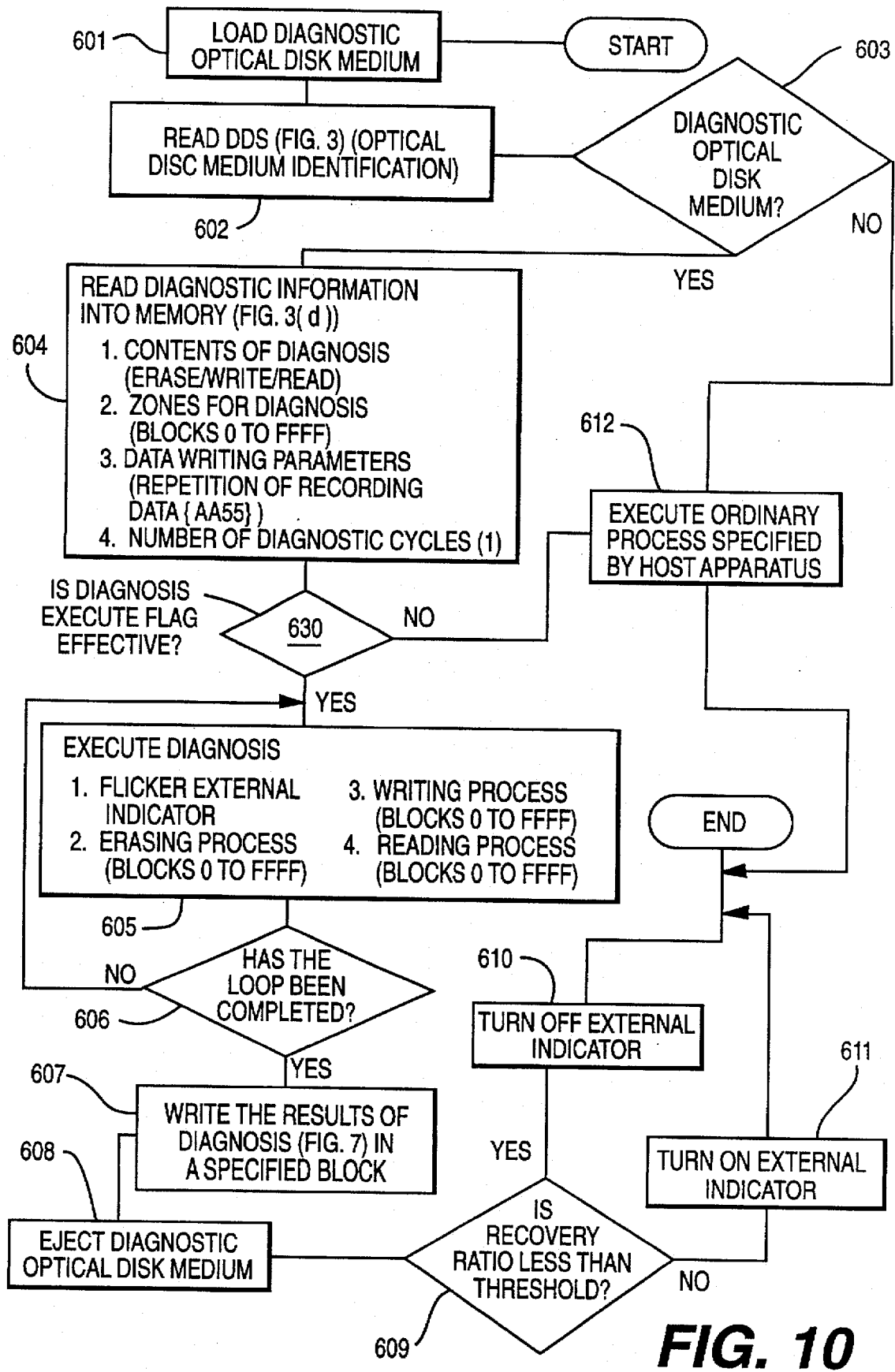
FIG. 10 is a flowchart of a diagnostic method for analyzing an optical disk apparatus, according to a preferred embodiment of the present invention.

FIG. 9 shows a diagnostic optical disk medium flag having a bit assigned to a diagnosis execute flag by way of example, and FIG. 10 is a flowchart of a diagnostic method designed by partly modifying the diagnostic method shown in FIG. 6. Only the differences from the diagnostic process shown in FIG. 6 will be described.

After storing the diagnostic information in the memory in step 604, the diagnosis execute flag 808 is examined in step 630 to see whether or not the diagnosis execute flag 808 indicates that diagnosis is effective. Diagnosis is executed in step 605 if diagnosis is effective, or the ordinary process specified by the host apparatus is executed in step 612 if diagnosis is ineffective. The diagnosis execute flag is set to the effective state when an operation for reading the diagnostic information is the newest one in the operation history, or a control logic to set the diagnosis execute flag to the ineffective state is employed when the diagnostic process operation is the newest one in the operation history, which further facilitates the use of the optical disk apparatus.

The use of the control logic saves labor for setting the optical disk apparatus in a diagnosis-ineffective mode inhibiting the automatic start of diagnosis upon the loading of the diagnostic optical disk into the optical disk apparatus to read the results of the past diagnosis.

Figure 11:
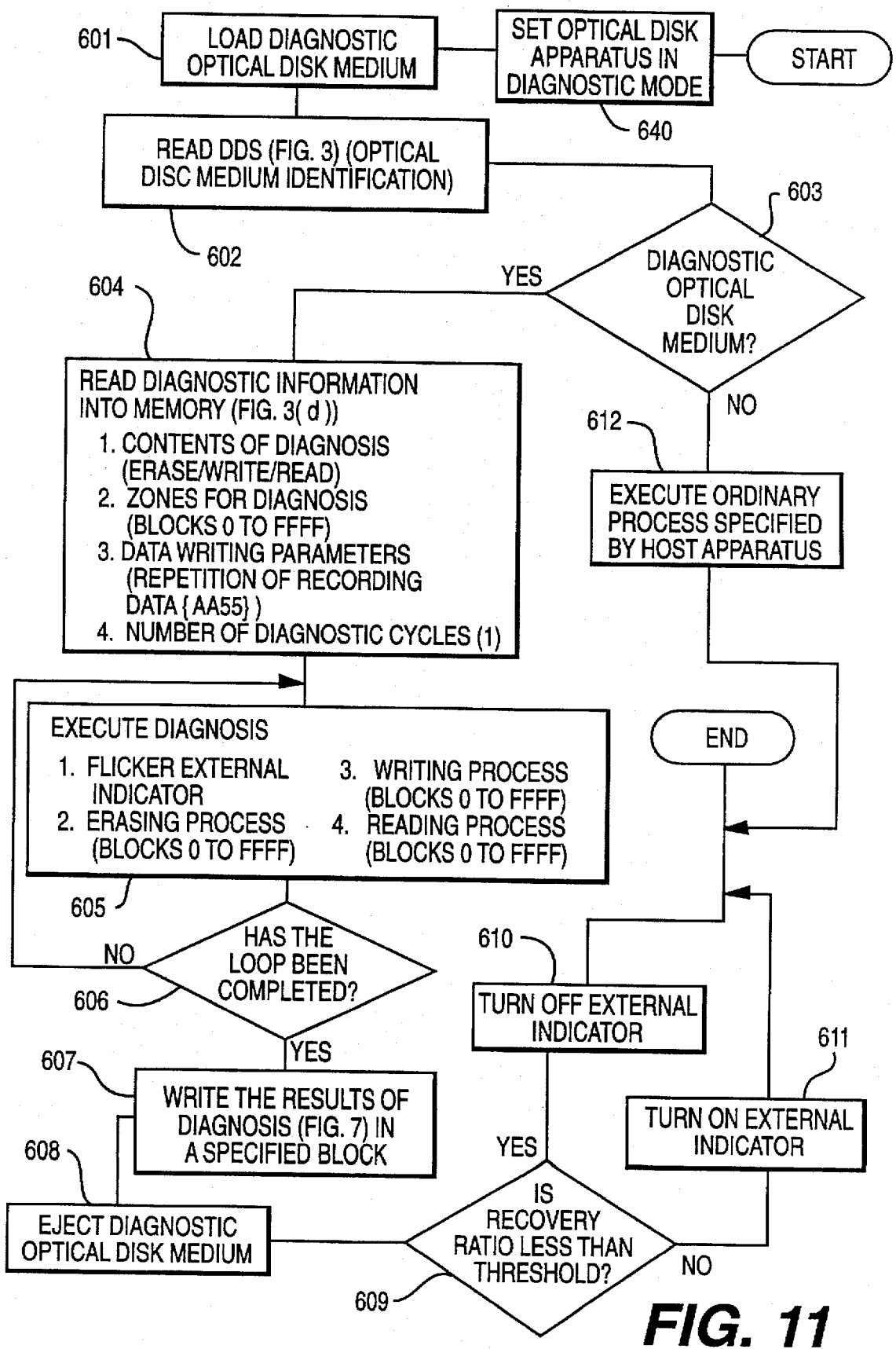
FIG. 11 is a flowchart of a diagnostic method for analyzing an optical disk apparatus, according to a preferred embodiment of the present invention.

As shown in FIG. 11, the optical disk apparatus may be designed to operate either in a diagnosis-effective mode or a diagnosis-ineffective mode. The optical disk apparatus may be set in the diagnosis-effective mode in the normal state (step 640), and diagnosis may be inhibited by setting the optical disk apparatus in the diagnosis-ineffective mode. The diagnosis-ineffective mode can be used for rewriting the diagnostic optical disk medium flag. Further, the optical disk apparatus may be set in the diagnosis-ineffective mode by means of hardware (for example, by operating a dip switch), or by means of software (for example, by a special operation, such as pressing a special button when operating a memory switch or when connecting the optical disk apparatus to a power supply).

As mentioned above, the optical disk apparatus in this embodiment uses the diagnostic optical disk embodying the present invention, carries out the diagnostic method embodying the present invention, and starts diagnosis automatically without requiring the intervention of a host apparatus such as a host computer.

Since the diagnostic information is written beforehand on the diagnostic optical disk, diagnostic conditions need not be specified for each diagnostic cycle, facilitating the operation of the optical disk apparatus by the user. Further, a plurality of optical disk apparatuses can be automatically analyzed on the manufacturing line simply by loading the diagnostic optical disk into each of the plurality of optical disk apparatuses, improving the efficiency of the manufacturing process.

The quality of the optical disk apparatus can be confirmed by the user's computer system environment by formatting the diagnostic optical disk using an appropriate OS, and by writing the results of diagnosis in ASCII codes.

Although various preferred embodiments of the invention has been described, modifications will become apparent to the person of ordinary skill upon gaining an understanding of the teachings through which the invention has advanced the state of the art. For example, the preferred optical disk apparatus has both a writing function and a reading function. However, the present invention is applicable also to an optical disk apparatus having only a reading function. In an optical disk apparatus having only a reading function, the diagnostic information may decide that the optical disk apparatus is defective when a predetermined standard read level is beyond the limits of a predetermined range. Since the results of diagnosis cannot be written on the diagnostic optical disk when the optical disk apparatus is defective, it is necessary to inform the user of the abnormal condition by ejecting the diagnostic optical disk medium from the optical disk apparatus, turning on an indicator, such as an LED, or by generating an alarm sound.

I claim:

1. An optical disk apparatus, comprising:

detecting means for detecting presence/absence of an optical disk;

disk rotating means for rotatably driving the optical disk;

an optical head for writing information on and reading information from the optical disk;

optical head position control means for controlling the position of the optical head relative to the optical disk;

a signal control system for controlling write signals representing information to be written by the optical head and read signals representing information read by the optical head; and means for reading a predetermined read-only diagnostic identification information writing zone of the optical disk upon loading of the optical disk to thereby determine whether the optical disk is a diagnostic optical disk, and for selecting one of a diagnostic mode and a normal operating mode according to the determination.

2. A self-diagnostic method of checking an optical disk apparatus that reads information from an optical disk loaded into the optical disk apparatus, the diagnostic method comprising the following steps:

determining whether the optical disk is a diagnostic optical disk upon loading of the optical disk into the optical disk apparatus;

if said determining step determines that the optical disk is a diagnostic optical disk, reading diagnostic information written on the diagnostic optical disk; and carrying out diagnosis of an optical disk apparatus according to the diagnostic information.

3. A diagnostic optical disk containing first information identifying itself as a diagnostic optical disk for diagnosing an optical disk apparatus, and second information specifying contents of diagnosis.

4. An optical disk apparatus as claimed in claim 1, wherein the means for reading a predetermined diagnostic identification information writing zone reads the predetermined diagnostic identification information writing zone automatically upon loading of the optical disk.

5. An optical disk apparatus as claimed in claim 1, wherein the optical disk contains contents of diagnosis stored in a user's zone of the optical disk.

6. An optical disk apparatus as claimed in claim 5, further comprising means for autonomously starting diagnosis upon loading of the optical disk and upon determination by said means for reading a predetermined diagnostic identification information writing zone that the optical disk is a diagnostic optical disk;

wherein the means for autonomously starting diagnosis automatically reads diagnostic information, including contents of diagnosis, from the optical disk.

7. An optical disk apparatus as claimed in claim 6, further comprising means for setting the optical disk apparatus in a diagnosis-ineffective mode upon completion of diagnosis, thereby inhibiting the automatic start of diagnosis upon loading of the optical disk.

8. An optical disk apparatus as claimed in claim 6, further comprising means for writing results of the diagnosis in text format.

9. An optical disk apparatus as claimed in claim 1, wherein the optical disk contains contents of diagnosis stored in a read-only medium definition information writing zone of the optical disk.

10. An optical disk apparatus as claimed in claim 9, further comprising means for autonomously starting diagnosis upon loading of the optical disk and upon determination by said means for reading a predetermined diagnostic identification information writing zone that the optical disk is a diagnostic optical disk;

wherein the means for autonomously starting diagnosis automatically reads diagnostic information, including the contents of diagnosis, from the medium definition information writing zone.

11. An optical disk apparatus as claimed in claim 10, further comprising means for writing results of the diagnosis in text format.

12. An optical disk apparatus as claimed in claim 11, further comprising means for setting the optical disk apparatus in a diagnosis-ineffective mode upon completion of diagnosis, thereby inhibiting the automatic start of diagnosis upon loading of the optical disk.

13. An optical disk apparatus as claimed in claim 9, wherein the diagnostic identification information writing zone is located in the medium definition information writing zone.

14. An optical disk apparatus as claimed in claim 1, wherein the predetermined diagnostic identification information writing zone is located in the disk definition structure DDS of the optical disk.

15. A self-diagnostic method as claimed in claim 2, wherein the step of automatically determining whether the optical disk is a diagnostic optical disk is performed by reading predetermined diagnostic identification information from a diagnostic identification information writing zone on the optical disk.

16. A self-diagnostic method as claimed in claim 2, wherein said step of reading diagnostic information is performed autonomously.

17. A self-diagnostic method as claimed in claim 15, further comprising the step of setting the optical disk apparatus in a diagnosis-ineffective mode upon completion of diagnosis, thereby inhibiting the automatic start of diagnosis upon loading of the optical disk.

18. A self-diagnostic method as claimed in claim 2, further comprising the step of writing results of the diagnosis in text format.

19. A diagnostic optical disk as claimed in claim 3, wherein the second information is stored in a user's zone of the diagnostic optical disk.

20. A diagnostic optical disk as claimed in claim 3, wherein the second information is stored in a read-only medium definition information writing zone of the diagnostic optical disk.

21. A diagnostic optical disk as claimed in claim 3, wherein the first information is located in the disk definition structure DDS of the diagnostic optical disk.

22. A diagnostic optical disk as claimed in claim 3, wherein the first information and second information are both located in a read-only information writing zone.

* * * * *